US005093671A

United States Patent [19]

Morotomi et al.

[11] Patent Number: 5,093,671

[45] Date of Patent: Mar. 3, 1992

[54] PRINTED METALLIC CONTAINER AND METHOD FOR MULTICOLOR PRINTING THEREOF

[75] Inventors: Masaki Morotomi; Tsuneo Imatani; Akihiko Morofuji, all of Kanagawa, Japan

[73] Assignee: Toyo Seikan Kaisha, Ltd., Tokyo, Japan

[21] Appl. No.: 602,236

[22] Filed: Oct. 26, 1990

[51] Int. Cl.$^5$ .......................... G01D 9/42; B65D 90/04

[52] U.S. Cl. ...................................... 346/1.1; 346/108; 346/135.1; 220/456

[58] Field of Search ............. 346/1.1, 108, 150, 153.1, 346/157, 135.1, 160; 220/456, 454

[56] References Cited

U.S. PATENT DOCUMENTS

| | | | |
|---|---|---|---|
| 3,944,682 | 3/1976 | Miyatsuka | 427/74 |
| 5,018,640 | 5/1991 | Morofuji et al. | 220/456 |

FOREIGN PATENT DOCUMENTS

| | | |
|---|---|---|
| 1077123 | 7/1967 | United Kingdom . |

*Primary Examiner*—Mark J. Reinhart

*Attorney, Agent, or Firm*—Armstrong, Nikaido, Marmelstein, Kubovcik & Murray

[57] ABSTRACT

A printed metallic container comprising a metallic substrate provided with a titanium oxide-containing organic resin coat film layer as a substrate coat film for printing having a photosensitive characteristic of $I\times t_{1/2}<100$ mW·sec/cm$^2$ (I: light intensity, $t_{1/2}$: light attenuation half-life of surface potential).

A multicolor printing method comprising continuously rotating and delivering a metallic containers, uniformly charging the containers wtih charge phases shifted and exposing the containers by moving light from a light source in synchronism with the rotation delivery of the containers.

8 Claims, 9 Drawing Sheets

PRINTED METALLIC CONTAINER AND METHOD FOR MULTICOLOR PRINTING THEREOF

DESCRIPTION

1. Technical Field

The present invention relates to a printed metallic container provided with a photoconductive layer commonly attaining a function as a white coating as a substrate coat film for printing and a method of effecting a multicolor printing to a metallic container or metallic base material for the container by an electrophotographic method.

2. Background Art

As a printing method for a cylindrical metallic container or a metallic base material for a container, there has been proposed a lithographic offset printing method and a letterpress printing method. These printing methods are superior in mass production of printed materials, but require press plates including a graphic process in advance of the printing operation, involving much time and labor and, hence, in a multicolor printing technique, much time and labor are required for registering of the respective colors.

In addition, in accordance with variety of the value judgments, there is increasing requirement of the printing of the small amount of the multiple kinds of products and it becomes difficult to satisfy this requirement by conventional printing methods which lack in instantaneous printing functions.

In the meantime, as a printing technique utilizing no plate, an electrophotographic method is known. It is an electrostatic image formation method where an image exposure is effected after uniformly charging the surface of the photoconductive material and the charge of the exposed portion is attenuated to form an electrostatic latent image, and further a toner is attracted to the electrostatic latent image to form a visual image.

As a photoconductive material to be used for the electrophotographic printing method, there may be mentioned selenium, amorphous silicon, organic photoconductive material, zinc oxide, titanium oxide or the like and, particularly, the titanium oxide photosensitive material can form images of high resolution and is practically used as the material for paper or film.

However, in the knowledge of the present inventors, a printed metallic container utilizing the titanium oxide photosensitive material has not yet been realized in practical use.

A metallic container or a metallic base material having a titanium oxide photosensitive layer on the surface and a printing directly formed on said photosensitive layer by an electrophotographic printing method suffers from the following problems.

Namely, in order to form the electrostatic latent image by attenuating the electric charge uniformly applied to the titanium oxide photosensitive layer by light exposure, it is required for the surface of the metallic container or metallic base material contacting the titanium oxide photosensitive material to be formed with an electroconductive material.

However, metal utilized for forming the metallic container is always provided with a surface treating film mainly composed of metal oxide, hydrated metal oxide or the like. Said film substantially has an insulating property so that a light current hardly passes the material or the passing speed is very slow even if the light current passes. The application of such surface treating film is essential to the metal for metallic containers.

In a container manufacturing process, the container is subjected to severe workings such as neck-in working, flange working or bead working and, in addition, when a content is filled up in the container, the container is exposed to hot water for sterilization and to the outdoor environment when the container is delivered in a market. In order to withstand the severe conditions such as described above, it will be necessary to give an anti-corrosion property to the metal itself and to provide a strong adhesion property between the metal and the coat film applied for protecting the metal. The surface treating film is applied for achieving the characteristics described above.

Accordingly, it is difficult for the metallic container made of conventional material to be directly printed by the electrophotographic printing method.

As described above, it is required for the substrate coat film for the metallic container printing to have high workability, high adhesion property, hot-water resisting property or the like and this requirement makes it difficult to utilize the conventionally known titanium oxide photosensitive material. This will be understood by the fact that the conventional titanium oxide photosensitive material is applied on a paper or plastic film to be used as a copy sheet.

The present invention was conceived in view of the above points and aims to provide a printed metallic container capable of instantaneously printing small amount of multiple kinds of products by utilizing the electrophotographic printing method which does not require a print press for the printing to the metallic container or the metallic base material.

Another object of the present invention is to provide a printed metallic container capable of utilizing an organic resin coat film including the titanium oxide superior in the workability and the adhesion property t the metal as a photosensitive material commonly utilized as a white coating.

The present inventors have proposed as shown in FIG. 1, a method of carrying out the multicolor printing by an electrophotographic printing method, on cylindrical metallic containers having a photoconductive photosensitive layer laminated on the surface (Japanese Patent Application No. 62-215279, filed on Aug. 31, 1987).

Namely, a metallic container 1 having a photosensitive layer on the surface is delivered. The photosensitive layer is charged in an electrophotographic unit 2 by scorotron-type charging device 5 and an electrostatic latent image is formed by an exposure device 6. A toner (for example, cyan toner) is attracted to the electrostatic latent image by a developing device 7 to visualize the latent image and the resulting toner image is heat-fixed by a fixing device 8(for example, an induction heating type).

In the like manner, a magenta toner image is fixed in an electrophotographic unit 3 and a yellow toner image is fixed in an electrophotographic unit 4 to effect a multicolor printing process.

Reference numeral 9 designates a cooling device and 10 designates a detector for the registering of the multicolor image.

The electrophotographic printing method makes it possible to carry out a multicolor printing on the metallic container, but involves the following problems.

(a) The delivery of the metallic containers 1 is stopped at the respective positions corresponding to the charging devices 5, the exposure devices 6, the developing devices 7 and the fixing devices 8 of the respective electrophotographic units 2, 3 and 4 and the metallic containers 1 are rotated at these positions to be subjected to the respective treatments. Accordingly, the intermittent delivery between the respective units and between the respective devices in each unit and the intermittent rotation at the location of the respective devices are required. These intermittent delivery and rotation make slow the speed of the production of the multicolor-printed metallic containers and require troublesome control means for the operations of the intermittent delivery and intermittent rotation of the containers 1, resulting in the increasing of the container manufacturing cost.

(b) A scorotron type charging device 5 such as shown in FIG. 2(A) is utilized. Namely, an interior of a metallic shield 11 (for example, made of an aluminium material) provided with a lower portion opened is divided into required casings 11*a*, 11*b*, 11*c* and 11*d* in a delivering direction as shown by an arrow of the metallic container 1. Discharge electrodes 12 (for example, made of tangsten wires) are arranged in the respective casings and a plurality of grid electrodes 13 (for example, scorotron electrodes in which tangsten wires arranged with spaces of 1 to 3 mm) insulated from the casings 11*a* to 11*d* are arranged at the opened surfaces of the respective casings.

The metallic shield 11 is earthed, and the discharge electrodes 12 are applied with voltages Vc (for example, Vc = −6 KV), and the grid electrodes 13 are applied with bias voltages Vg.

According to this manner, there is used the feature that the charge voltages Vs are limited by the bias voltages Vg as shown by the charge characteristics in FIG. 2(C).

Although, in the example described above, the metallic shield 11 is divided into four casings 11*a* to 11*d*, this is based on the fact that the outer periphery of the metallic container 1 is divided into four charged areas a, b, c and d, but the division of the shield 11 is not limited to four casings and may be optionally changed in accordance with the length of the outer periphery of the metallic container.

Accordingly, as shown in FIG. 2(A), since the casings 11*a* to 11*d* are arranged in series linearly along the delivering direction of the metallic container 1, the gaps between the circular surfaces of the charged areas a, b, c and d and opposing grid electrodes 13 are not uniform (the gaps gradually increase from the central grid electrode towards both end grid electrodes). Accordingly, the charge potentials of the charged areas a, b, c and d of the metallic container 1 includes potentials Vd lower than a constant surface potential Vs at the starting portion and the end portion of the charged areas a, b, c and d as shown in a developed view of FIG. 2(B), thus lacking in uniformity of potentials. This phenomenon adversely affects the formation of the electrostatic latent image and the toner adhesion amount, resulting in the printed material having uneven color tone.

The present invention was conceived by taking into consideration the above facts and provides a multicolor printing method capable of, during the continuous delivering process of the cylindrical metallic containers, uniformly charging the photosensitive material layer of each of the metallic containers to a constant surface potential and increasing the exposure speed for the photosensitive layer.

Disclosure of Invention

The present invention provides a printed metallic container which has a titanium oxide-containing organic resin coat film layer of a photosensitive characteristic of $I \times t_{\frac{1}{2}} < 100$ mW·sec/cm$^2$ (I: light intensity and $t_{\frac{1}{2}}$ light attenuation half-life of surface potential) as a substrate coat film for printing, formed on a surface st treating film layer of a thickness of 0.2 μ or less, the surface treating film layer being provided on a metallic base material.

The present invention further provides a multicolor printing method in which respective color printing processes are applied to a cylindrical metallic container by an electrophotographic printing method and the container is provided with a titanium oxide-containing organic resin coat film layer having a photosensitive characteristic of $I \times t_{\frac{1}{2}} < 100$ mW·sec/cm$^2$ formed on a surface treating film layer of a thickness of 0.2 μ or less overlying the surface of the metallic base, the method comprising the steps of continuously delivering the metallic containers supported by container supporting means with electrically earthed state of the containers while rotating the metallic containers in proportional synchronism with the delivered displacement of the metallic containers, charging a titanium oxide-containing organic resin coat film to a constant surface potential by a plurality of charging devices arranged in a delivering direction of the metallic containers and thereafter charging the same to the same potential as the surface potential by shifting the charge phases and exposing for forming an electrostatic latent image while sequentially exposing the charged surface to a light image by transferring light from a light source in synchronism with the rotation delivery of the metallic container.

Namely, according to the present invention, the container is subjected, in the manufacturing process, to severe workings such as neck-in working, flange working and bead working. In addition, the metallic container is exposed to hot water for the sterilization thereof when a content is filled and, furthermore, when the container is marketed, the container is exposed to a severe outdoor environment. In order to withstand such severe conditions, it is necessary to endow with anticorrosion property for the container itself and with strong adhesion property between the container and the coat film formed for the protection of the container. The surface treating film is provided for achieving these characteristic features.

It is important to the present invention that the surface treating film has a thickness of 0.2 μ or less. Since the surface treating film has a nature like an insulating material, upon exposure the light attenuation speed is slow or light attenuation is not caused even when the titanium oxide photosensitive layer is provided, in case of the surface treating film being more than 0.2 μ thick, and accordingly, it is difficult to curry out the direct printing process by the electrophotographic printing method.

However, the light attenuation can be caused with sufficient speed and the printing by the electrophotographic printing method is possible by reducing the thickness of the surface treating film to the above mentioned range.

According to the present invention, in order to obtain a fine electrostatic latent image for a short time light irradiation, it is important to use a titanium oxide-containing organic resin coat film layer as the substrate coat film for the printing, having a photosensitive characteristic of $I \times t_{\frac{1}{2}} < 100$ mW·sec/cm$^2$ (I: exposure light intensity (mW/cm$^2$), $t_{\frac{1}{2}}$ light attenuation half-life of surface potential (sec)).

In the case where the photosensitivity is outside of the above described range, it is necessary to irradiate a light for a long time or a light of high intensity and, hence, it becomes difficult to carry out the fine printing operation at high speed.

Furthermore, in the present invention, the metallic containers are continuously delivered while being supported by the container supporting members along the whole longitudinal direction of the multicolor printing system under the electrically earthed condition and the containers are rotated in proportional synchronism with the delivered displacement of the metallic containers, so that the respective treatments such as charging, exposing, developing and fixing treatments are exactly performed and the positional registering can be easily and exactly made with respect to the respective colors. Moreover, the multicolor printing operation can be performed at high speed.

In addition, the metallic containers are repeatedly charged with the charge phases shifted by a plurality of charging devices arranged along the rotation delivered direction of the containers so that the portions of the uneven charge potentials are corrected and, hence, the constant and uniform surface charge potential can be obtained, whereby it is possible to form the stable electrostatic latent image in the exposure treatment after the charging process.

Furthermore, since the metallic containers are continuously exposed for forming images while the light from the light source moving in synchronium with the rotation delivery of the electrically earthed metallic containers, the exposing speed can be increased to a great extent and the dissipation of the charge in the exposing process can be surely performed, whereby the stable electrostatic latent image can be formed and the exposing efficiency can be enhanced.

BEST MODE FOR CARRYING OUT THE INVENTION

Figure 1:
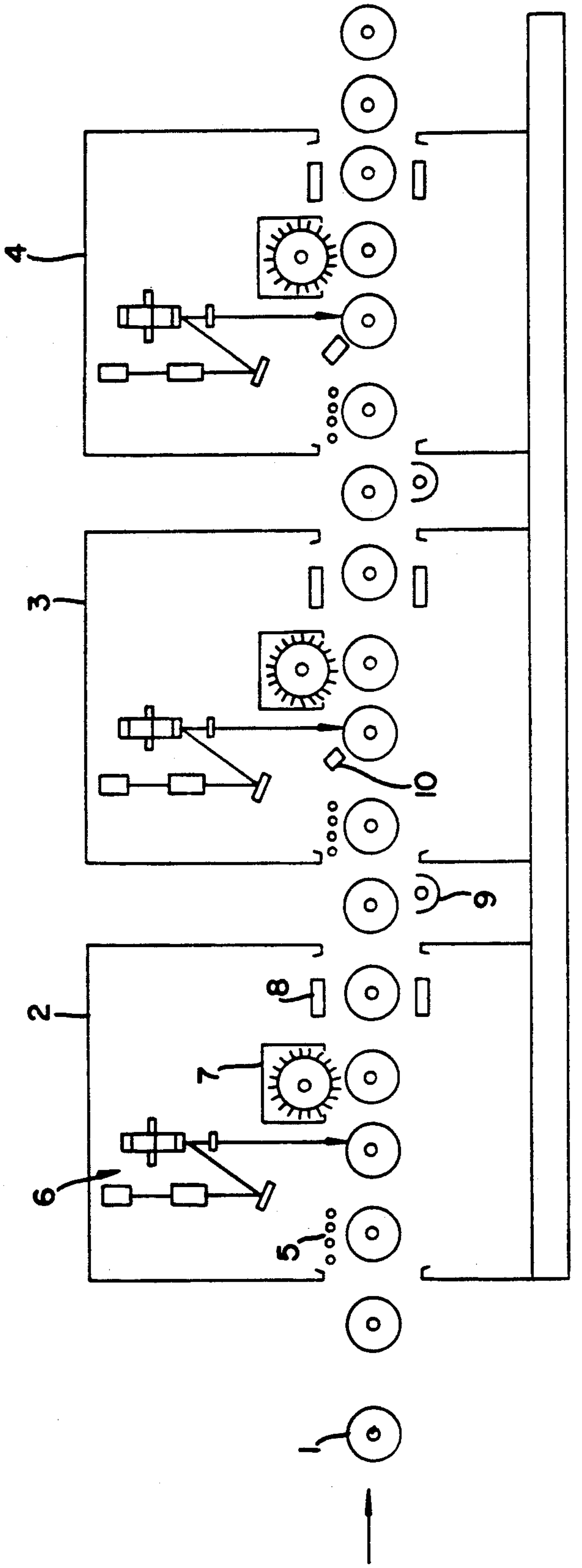
FIG. 1 is a schematic view of a multicolor printing line for metallic containers in accordance with a conventional electrophotographic printing method.
Figure 2A:
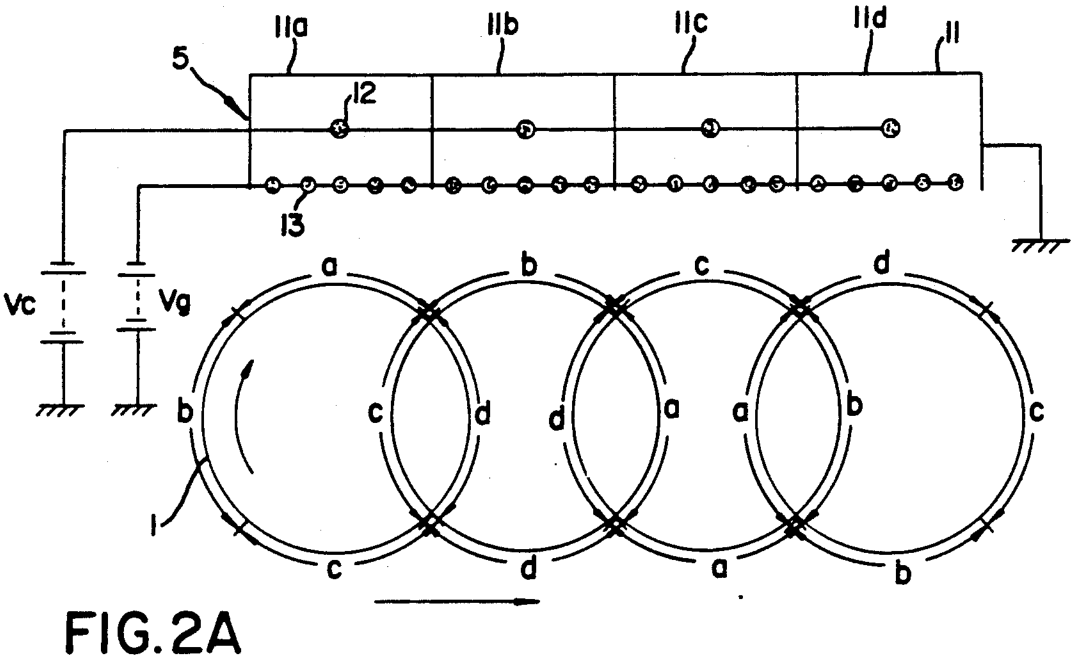
FIG. 2(A) is a view showing a conventional charging device.
Figure 2B:
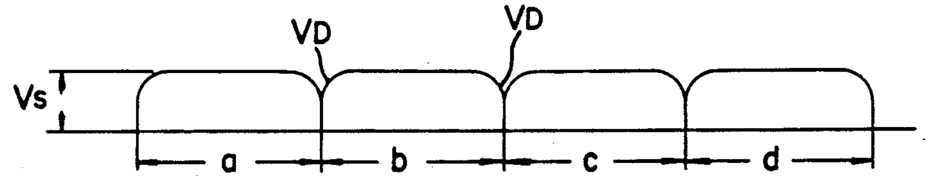
FIG. 2(B) is a developed view of a charged potential.
Figure 2C:
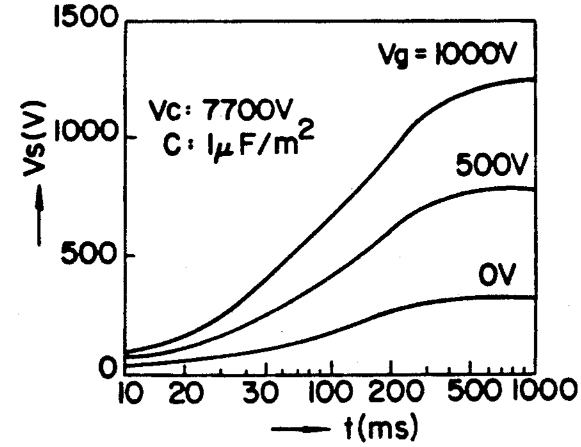
FIG. 2(C) is a graph representing the charge characteristics.

For the detailed disclosure of the present invention, concrete examples of printed metallic containers and devices for carrying out a multicolor printing method for the metallic containers will be described hereunder with reference to the accompanying drawings.

The described examples are referred to the printing processes for metallic containers, but may be referred to metallic base materials which are to be formed into the metallic containers after the printing operations and like reference numerals are added to elements or members common to those described for the respective examples.

Figure 3:
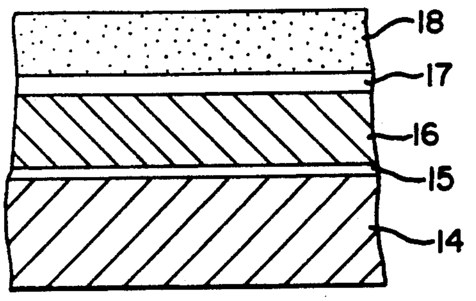
FIG. 3 is a sectional view showing a part of a printed metallic container according to the present invention.

FIG. 3 shows a sectional view of a part of the metallic container printed in accordance with an electrophotographic printing method, described later, in which 14 designates a cylindrical metallic container, 15 designates a surface treating film, 16 designates a substrate coat film for the printing, 17 designates a toner layer and 18 designates a finishing varnish.

In the present invention, the surface treating film 15 having a thickness of 0.2 $\mu$ or less is selected and a titanium oxide-containing organic resin coat film having a photosensitive characteristics of $I \times t_{\frac{1}{2}} < 100$ mW·sec/cm$^2$ (I: light intensity, $t_{\frac{1}{2}}$ light attenuation half-life of surface potential) is selected as the substrate coat film for the printing. These films are used in combination.

As the material for the metallic container 14 there may be used a plating steel plate such as tin-plating steel plate tinplate, zinc-plating steel plate, aluminium-plating steel plate, nickel-plating steel plate or chromium plating steel plate, a multilayered plating steel plate such as nickel-tin-plating steel plate, nickel-chromium plating steel plate or chromium-tin-plating steel plate, a light metal such as aluminium, or a composite material of these steel plates.

The surface treating film 15 is a treating film represented by an oxide or hydroxide of a plating metal necessarily formed by a plating treatment or the like treatment, and metal oxide, metal hydrate oxide or metal salt formed by an electrolytic treatment such as electrolytic chromic acid treatment, a chemical treatment such as phosphoric acid and/or chromic acid treatment, zirconium treatment and the like.

The titanium oxide is well known itself and the crystal structure thereof includes a rutile structure and a anatase structure and, in the present invention, it is preferred to use the rutile structure titanium oxide with high purity. The titanium oxide is produced by, for example, vapor phase oxidation method of the titanium tetrachloride, so-called chlorination method.

The titanium oxide is used in the form of a coat film in which the titanium oxide is dispersed in a binder resin, and the kind and amount of the binder resin is closely related to the physical property of the coat film and the adhesion to the metallic base material. Since the metallic container is subjected to severe workings such as neck-in working, flange working and bead working after the printing operation, it is required for the substrate coat film for the printing to have high adhesion property and high workability. Accordingly, it is preferred for the binder resin to be superior in the adhesion property with respect to the metallic base material and, accordingly, as the binder resin, there may be used polar group-containing thermosetting resins such as acrylic resin, alkyd resin, thermosetting vinyl resin, polyester resin, amino resin, epoxy resin, epoxy ester resin or polyurethane resin and the like, alone or in combination.

In order to satisfy the above mentioned characteristics, it is preferred that the weight ratio of titanium oxide to the binder resin is in composition range between 70/30 and 40/60. When the content of titanium oxide exceeds 70%, the coat film becomes brittle and cannot withstand the working of the container, resulting in cracking in the coat film. On the other hand, when the content is less than 40%, the photosensitivity is degraded and whiteness is lowered, resulting in incapability of serving as the white coat and the photosensitive material.

It is necessary only that the substrate coat film 16 for printing of the titanium oxide-containing organic resin coat film contains titanium oxide, and other pigment such as zinc oxide and the like and an additive may be added optionally in amounts which do not degrade the whiteness and the photosensitivity.

The dispersion of titanium oxide into the binder resin may be carried out by optional means such as ball mill, sand mill, roll mill and the like.

The coating operation to the metallic container or metallic base material may be carried out by optional means such as roller coating means, doctor coater, spraying means, electrostatic coating means or immersion coating means. After the coating operation, the coated film is heated and baked to form a desired coat film by a hot furnace, an infrared ray heating furnace, or a high frequency heating furnace for 5 sec. to 30 minutes at a temperature of about 100° to 350° C.

It is preferred for the coat film to have a thickness of 5 to 20 μ, and in case of less than 5μ, the whiteness and the photosensitivity will be degraded and in case of more than 20μ, the workability and the adhesion property between the coat film and the metallic container or metallic base material will be degraded by the strain remaining in the coat film.

The embodiment is further described in detail hereunder through concrete examples The embodiment is for illustration, but not for limiting the invention.

[Preparation of Coating Agent]

<Acrylic Resin>

Ethyl acrylate 450 g, ethyl methacrylate 100 g, acrylamide 150 g and styrene 300 g were dissolved in a mixed solvent of n-butanol 1000 g and tert-dodecyl mercaptan 10 g, and heated to 120° C. 5 g of cumene hydroperoxide was added two times every two hours to carry out a reaction for 6 hours. Next, a formaldehyde-butanol solution (315 g) and maleic anhydride 4 g were added thereto and then refluxed for three hours. After completion of the reaction, the butanol 500 g was removed by distillation and xylene was added to obtain a 50% acrylic resin solution.

<Alkyd Resin>

Phthalic anhydride (138 g) was agitated under nitrogen gas flow and dissolved while maintaining the temperature at 130° to 135° C. Linseed oil fatty acid 134 g was added to that solution and agitated to obtain a uniform solution. Glycerol 61.4 g was then added and the solution was heated to 240° C. at a temperature increasing speed of 1° C./min. Reaction was performed at this temperature for 15 min. After completion of the reaction, a mixed solvent of butyl acetate/-toluene=75/25 (vol%) was added to obtain a 50% alkyd resin solution.

<Melamine Resin>

Melamine 1 mol was added to formalin 6 mol having pH 8.0 adjusted with sodium hydroxide and the reaction was effected for 3 hours at a temperature of 60° C. Next, the pH was made to pH 6.0 and butanol 5 mol was added to carry out the reaction for 4 hours at 110° C. Water and excess butanol were recovered and xylene was added to obtain a melamine resin solution having 55% non-volatile component.

<Titanium Oxide>

An aqueous solution of titanium tetrachloride was prepared and allowed to stand for 24 hours. Thereafter, the solution was heated while agitating and hydrated titanium oxide was precipitated by hydrolysis at a temperature near the boiling point. The precipitation was then filtered, washed and dried and, thereafter, calcined for 2 hours at 700° C. and ground to obtain titanium oxide (1) having a grain diameter of 0.2 to 0.9μ.

<Titanium Oxide-containing Coating Material>

The above-mentioned acrylic resin and an amino resin were mixed with a mixing ratio of 70/30 (wt/wt) in terms of solid content to obtain an acrylamino resin coating material. In the next step, the above-mentioned titanium oxide (1) described above was dispersed in a ball mill into the acrylamino resin coating material with ratios of 80/20, 60/40 and 30/70 (wt/wt) in terms of solid content to obtain titanium oxide-containing coating materials (A), (B) and (C).

Further, a commercially available titanium oxide for pigment (produced by TEIKOKU KAKO KABUSHIKI KAISHA JR-300) was dispersed into the acrylamino resin with a ratio of 60/40 (wt/wt) in terms of solid content to obtain a titanium oxide-containing coating materials (D).

In addition, the above-mentioned alkyd resin and an amino resin were mixed with a mixing ratio of 70/30 in terms of solid content to obtain an alkydamino resin coating material. Next, the titanium oxide (1) described above was dispersed thereinto with a ratio of 50/50 (wt/wt) in terms of solid content to obtain a titanium oxide-containing coating material (E).

(EXAMPLE 1)

A bright tin plating steel plate having a base plate thickness of 0.30 mm (T-2 material, plating amount #50/50) was punched into a disc plate having a diameter of 120 mm. The disc plate was then drawn between a drawing punch and a drawing die in a conventional method so as to be formed into a cup-like shape having an inner diameter of 85 mm. The cup-like product was then again drawn and was subjected to ironing working using a ironing punch having a diameter of 65.3 mm and an ironing die with ironing ratio of 65% to form a drawn-ironed can (DI can) having an inner diameter of 65.3 mm and a height of 110 mm. The thus formed DI can was washed for defatting by a conventional method and then the surface treated by spraying, for 60 sec. at 55° C., using a bath consisting of sodium phosphate 3 g, potassium oxalate 0.5 g and deionized water 1 liter. After the washing, the surface of the DI can was dried. The thus formed surface treating coat film had a thickness of 0.02 μ.

The titanium oxide-containing coat (B) was then applied by a mandrel coater so as to have a dried film thickness of 15 μ and, thereafter, the film was baked in an oven for 60 sec. at 200° C.

Then, the titanium oxide photosensitive layer-coated DI can was subjected to the multicolor printing treatment by an electrophotographic printing method as described later. An acrylic resin finishing varnish was then applied by the mandrel coater and the thus treated DI can was heated and baked in a heating oven. In the next step, an epoxy resin coating material was sprayed on the inner surface of the DI can and the sprayed coat was then baked. Thereafter, a triple-neck-in working, a flange working and the like working, which are per se known for a usual can manufacturing process, were effected to produce a final printed metallic container.

According to this Example 1, a fine or precise color image having a good halftone reproducibility was formed on the printed metallic container and the whiteness of the titanium oxide-containing coat film was sufficiently realized. In addition crack and peeling of the titanium oxide-containing coat film were not observed at portions such as necked-in portion and flange portion at which severe workings were effected, and the thus produced metallic container exhibited a good performance as a container.

Furthermore, beer was filled up in the thus formed container in a cooled condition and a lid was double seamed. The container was thereafter heated to 62° C. by a pasteurizer to effect the sterilization, but no crack and peeling of the titanium oxide-containing coat film were observed.

(EXAMPLE 2)

A printed metallic container was produced by substantially the same manner or process as that of Example 1 except that the surface treating coat film was formed by spraying a bath consisting of zinc nitrate 20 g, zinc phosphate 10 g, phosphoric acid 10 g and deionized water 1 liter; for 40 sec. at 70° C., and the alkydamino resin coat (E) was then coated thereon as a titanium oxide-containing coating material.

In this process, the surface treating coat film had a film thickness of 0.1 μ and the alkydamino resin coat (E) had a photosensitivity of 30 mW·sec/cm$^2$.

The printed metallic container according to the present invention provided a precise color image having an excellent halftone reproducibility and a sufficient of the titanium oxide-containing coat film. Moreover, no crack and pealing were observed at portions such as necked-in portion and flange portion which were subjected to severe workings and the thus produced container provided excellent performance as a container.

Beer was filled up in this printed metallic container and a lid was double seamed. Thereafter, the container was heated and sterilized by the pasteurizer at 62° C. In such heating process, no crack and peeling of the titanium oxide-containing coat film were observed.

(COMPARATIVE EXAMPLE 1)

A printed metallic container was produced by repeating the procedure of Example 1 except that the titanium oxide-containing coating material (A) was used. The surface treating coat film had a film thickness of 0.02 μ and the titanium oxide-containing coat film (A) had a photosensitivity of 0.4 mW·sec/cm$^2$.

According to this Comparative Example 1, the resulting printed metallic container had a precise color image, but large cracks were observed at portions of the titanium oxide-containing coat film corresponding to the necked-in portion and flange portion. Therefore, the titanium oxide-containing coating material (A) was not usable as a substrate for the printing of the metallic container.

(COMPARATIVE EXAMPLE 2)

A printed metallic container was produced by repeating the procedure of Example 1 except that the titanium oxide-containing coating material (C) was used. The resulting surface treating coat film had a film thickness of 0.02 μ and the titanium oxide-containing coat film (C) had a photosensitivity of 230 mW·sec/cm$^2$. In this Comparative Example 2, a fog is caused to the image due to the lowering of the photosensitivity of the titanium oxide-containing coat film, and the whiteness was not sufficient so that a fine printing product was not obtained.

(COMPARATIVE EXAMPLE 3)

A printed metallic container was produced by repeating the procedure of Example 1 except that the titanium oxide-containing coating material (D) was used. The resulting surface treating coat film had a film thickness of 0.02μ.

In this Comparative Example 3, the light attenuation of the titanium oxide-containing coat film hardly occurred and, hence, it was not possible to measure the half-life of the light attenuation, and any image was not formed.

(COMPARATIVE EXAMPLE 4)

A printed metallic container was produced by repeating the procedure of Example 1 except that the titanium oxide-containing coating material (B) was applied by a mandrel coater in the thickness of 3 μ (as dried film).

The resulting surface treating coat film had a film thickness of 0.02 μ and the titanium oxide-containing coat film (B) had a photosensitivity of 1.2 mW·sec/cm$^2$.

The printed metallic container of this Comparative Example 4 had a precise color image having a good halftone reproducibility, but the whiteness and the hiding property of the titanium oxide-containing coat film were not sufficient and a fine printing was not obtained.

(COMPARATIVE EXAMPLE 5)

A printed metallic container was produced by repeating the procedure of Example 1 except that the titanium oxide-containing coating material (B) was applied by a mandrel coater in the thickness of 30 μ (as dried film).

The resulting surface treating coat film had a film thickness of 0.02 μ and the titanium oxide-containing coat film (B) had a photosensitivity of 0.4 mW·sec/cm$^2$.

The printed metallic container of this Comparative Example 5, had a precise color image, but cracks and peeling were observed at portions of the titanium oxide-containing coat film corresponding to the necked-in portion and flange portion of the container. Therefore, the coating material (B) was not usable as a substrate coat film for printing of the metallic container.

(COMPARATIVE EXAMPLE 6)

A printed metallic container was produced by repeating the procedure of Example 2 except that the surface treating spraying operation was performed for 90 sec. at 70° C. The resulting surface treating coat film had a film thickness of 0.23 μ.

According to this Comparative Example 6, a photocurrent did not flow and no image was formed at all.

(EXAMPLE 3)

An aluminium plate having a raw plate thickness of 0.32 mm (3004, H19) was punched into a disc plate having a diameter of 120 mm. The disc plate was then drawn between a drawing punch and a drawing die by a conventional method so as to be formed into a cup-like shape having an inner diameter of 85 mm. The cup-like product was again drawn and subjected to ironing working by using an ironing punch having a diameter of 65.3 mm and an ironing die with ironing ratio of 65.0% to form a drawn-ironed can (DI can) having an inner diameter of 65.3 mm and a height of 110 mm. The thus formed DI can was washed for defatting by a conventional method and then the surface was treated by spraying, for 30 sec. at 50° C., a bath consisting of $(NH_4)_2$ $ZrF_6$ 0.3 g. $H_2SiF_6$ 0.25 g, $H_3PO_4$ 0.3 g and deionized water 1 liter. After the washing, the surface of the DI can was dried. The thus formed surface treating coat film had a thickness of 0.03 μ.

The titanium oxide-containing coating material (B) was then applied by a mandrel coater so as to have a dried film thickness of 10 μ and, thereafter, the film was baked in an oven for 60 sec. at 200° C.

Then the resulting DI can coated with the titanium oxide photosensitive material was subjected to printing by an electrophotographic printing machine. The photosensitivity of the film thus baked of the container was 1.2 $mW\cdot sec/cm^2$.

An acrylic resin finishing varnish was then applied to the thus treated DI can and baked in a heating oven. In the next step, an epoxy resin coating material was sprayed on the inner surface of the DI can and then baked. Thereafter, a triple-neck-in working, a flange working and the like working, which are per se known for a usual can manufacturing process, were effected for the thus formed DI can to produce a final printed metallic container.

According to this Example 3, a fine and precise color image having a good halftone reproducibility was obtained on the printed metallic container and the whiteness of the titanium oxide-containing coat film was sufficiently realized.

In addition, neither crack nor peeling of the titanium oxide-containing coat film wa observed at portions such as necked-in portion and flange portion where severe workings were effected, and the thus produced printed metallic container had a good performance as a container.

Further, beer was filled up in the thus formed printed metal container in a cooled condition and a lid was double seamed. The container was thereafter heated to 62° C. by a pasteurizer to effect the sterilization, but no crack and peeling of the titanium oxide coat film were observed, and thereby the printed container was good.

Figure 4:
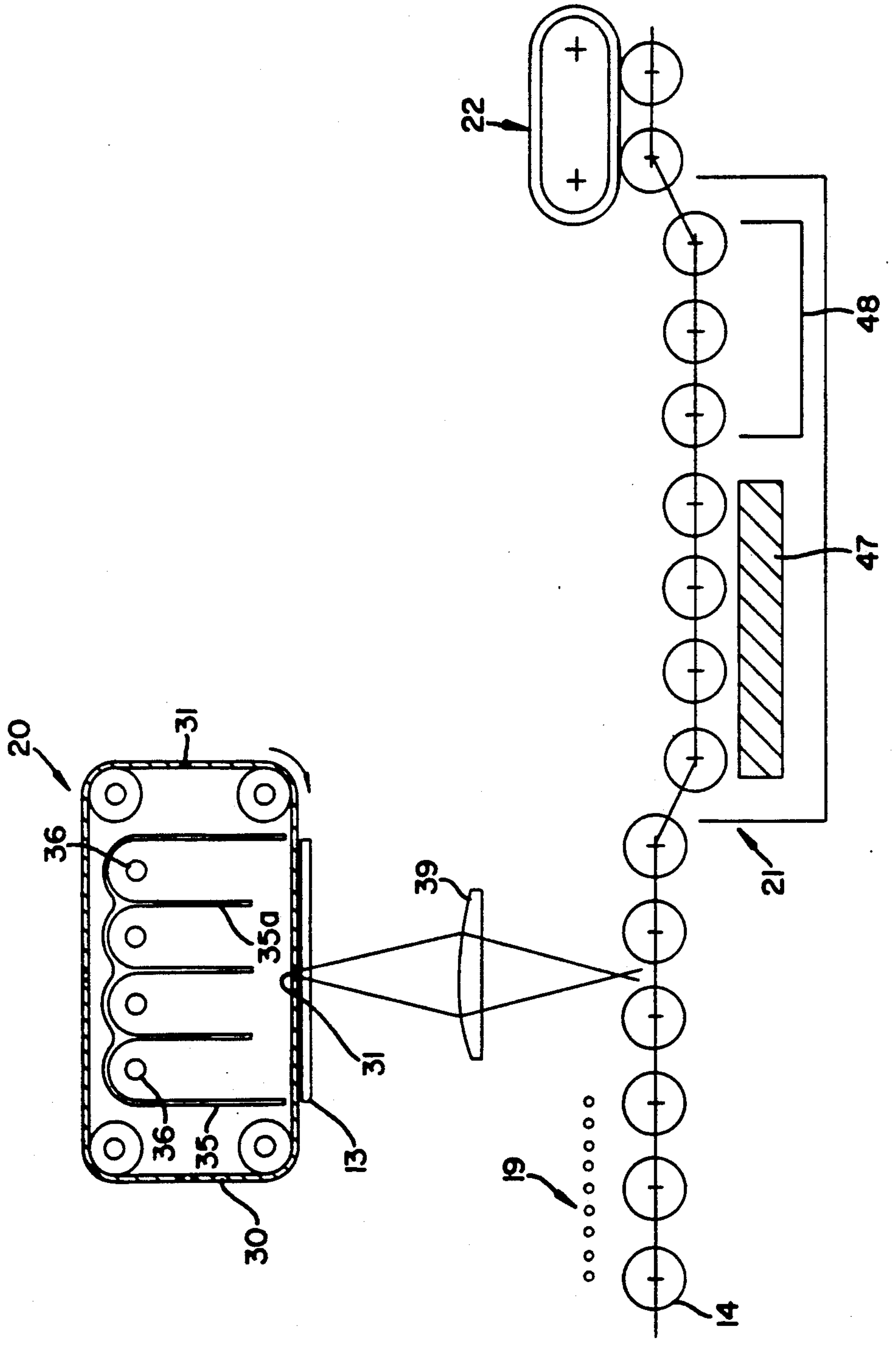
FIG. 4 is a schematic view of a single color printing line for the multicolor printing method for the metallic container in accordance with the electrophotographic printing method of the present invention.

FIG. 4 shows a schematic arrangement of a single color printing line for effecting a multicolor printing to a metallic container 14 provided with a substrate coat film 16 for the printing (in which only a single color printing line is shown for the reason that the other color printing process is carried out by substantially the same printing line arranged in series). The metallic containers 14 each having the substrate coat film 16 and supported by a conductive supporting member (described later) are rotated while being electrically earthed and continuously delivered to carry out a single color printing (for example, cyan toner printing) by means of a charging device 19, an exposure device 20, a developing device 21 and a fixing device 22.

During these processes, the rotation speed and the delivering speed of the metallic container 14 are set to a predetermined ratio (that is, for example, the container is rotated in proportional synchronism with the delivering displacement) so that the treatments by the respective devices can be precisely carried out and the positional registering can be easily and exactly achieved.

Figure 5:
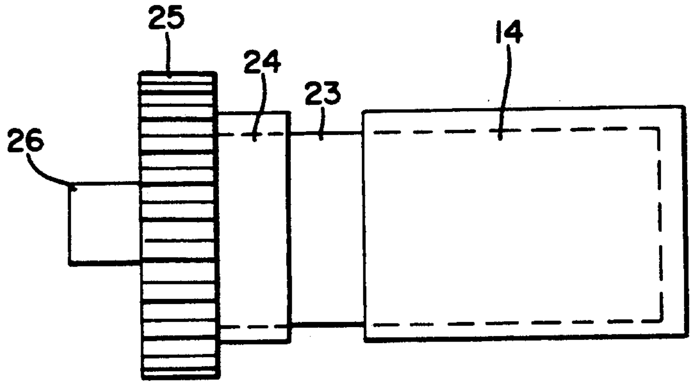
FIG. 5 is a side view in which the metallic container is supported by a container supporting member.
Figure 6:
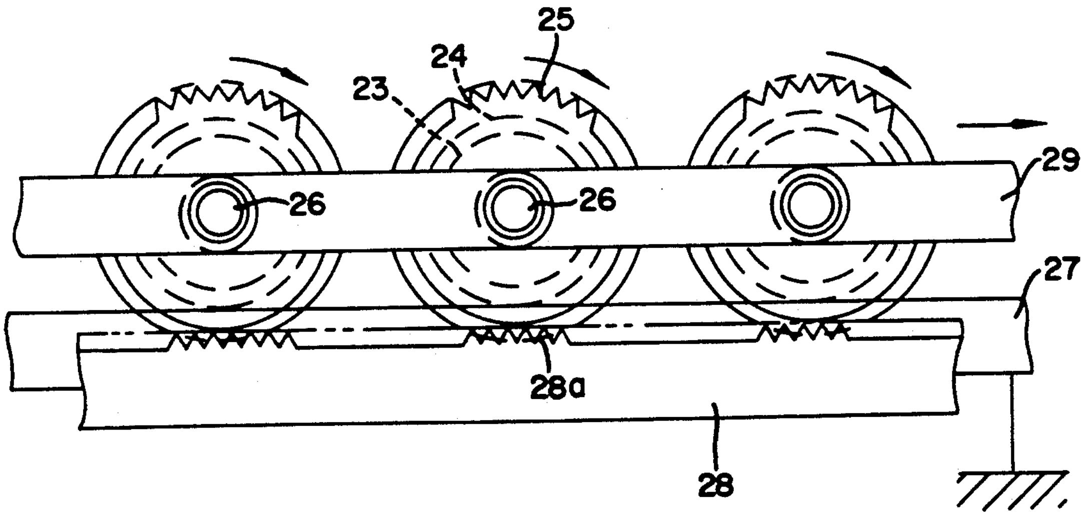
FIG. 6 is a schematic view showing continuously rotating and delivering condition of the metallic containers.

One example for rotating and delivering the metallic containers 14 while being electrically earthed is shown in FIGS. 5 and 6.

Referring to FIG. 5, a metallic ring 24 (for example, made of carbon) is mounted to the outer periphery of one end of a container supporting member 23 which is closely fitted in the metallic container 14 and a gear 25 provided with an outwardly projecting portion 26 is also mounted to the outer periphery of the supporting member 23.

Each of the container supporting members 23 is secured to a bearing, which is movable in a horizontal direction above a guide device.

Referring to FIG. 6, a band-shape earth conducting member 27 slidably contacted to the rotating metallic ring 24 and a guide rail 28 provided with teeth 28a meshed with the gear 25 are arranged in the delivering direction of the supporting member 23 along the whole longitudinal length of the multicolor printing line.

The respective projecting portions 26 of the adjacent container supporting members 23 are idly fitted into the end portions of feed chains 29 for the container supporting members 23 and the feed chains 29 are driven in an arrowed direction by a driving device, not shown.

Accordingly, the moving force of each of the container supporting members 23 in the arrowed direction due to the movement of the feed chain 29 in this direction is converted into the rotating and delivering force of the metallic container 14 in engagement of the gears 25 with the teeth 28a of the guide rail 28, the metallic ring 24 is rotated in the slidable contact on the earth conducting belt 27, and the metallic container 14 is rotated and delivered with the electrically earthed condition.

The ratio of the number of teeth of the gear 25 to that of teeth 28a of the guide rail 28 is set so that the metallic container 14 can rotate in proportional synchronism with the delivering displacement of the metallic container 14.

The electrical earthing of the metallic container 14 is achieved for the purpose of escaping the charges at the exposed portion to obtain a stable image (electrostatic latent image) at a time when the electrostatic latent image is formed by the exposure device 20 to expose the substrate coat film 16 for printing charged by the charging device 19.

With respect to this Example, the container supporting member is closely fitted in the metallic container with the earthed condition of the inner peripheral surface of the metallic container, but the present invention is not limited to this example and a container supporting member provided with a flange portion contacting the opened end of the metallic container may be utilized and, in this case, the earthed condition may be established at the opened end portion.

The establishment of the earthed condition is made by the location of the metallic ring and the earth conducting member, but the present invention is not limited thereto and a bearing for securing the container supporting member and a guide device for the bearing may be used as earthing medium.

Figure 7A:
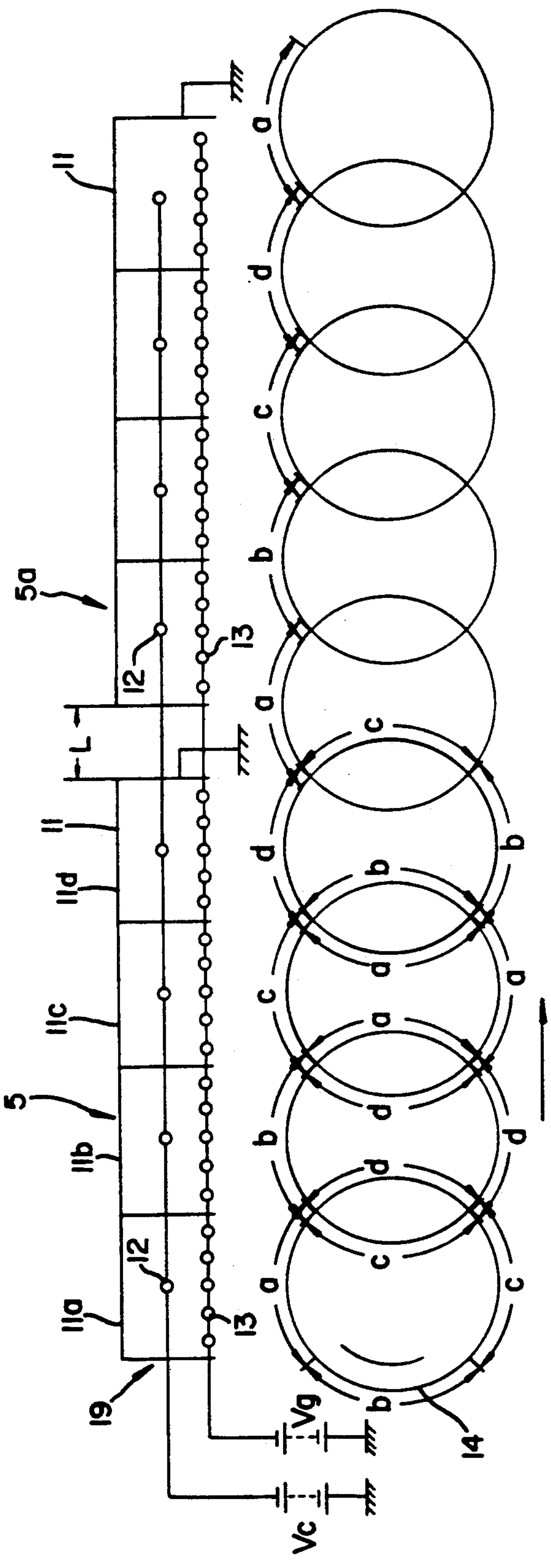
FIG. 7(A) is a view showing a charging device.

Each of the charging device 19 is shown in FIG. 7(A), which comprises a scorotron type charging device 5 located in a front stage and including the earthed metallic shield 11 located in the delivering direction of the metallic container and divided into four sections 11*a*, 11*b*, 11*c* and 11*d* in each of which a discharge electrode 12 to which a voltage of −6 KV is added and a grid electrode 13 to which a bias voltage Vg is added and comprises a charging device 5*a* located in a rear stage and having substantially the same structure of the charging device 5. Both the charging devices 5 and 5*a* are arranged with a space L delayed in ½ cycle of each of the charging areas of the metallic container 14.

Figure 7B:
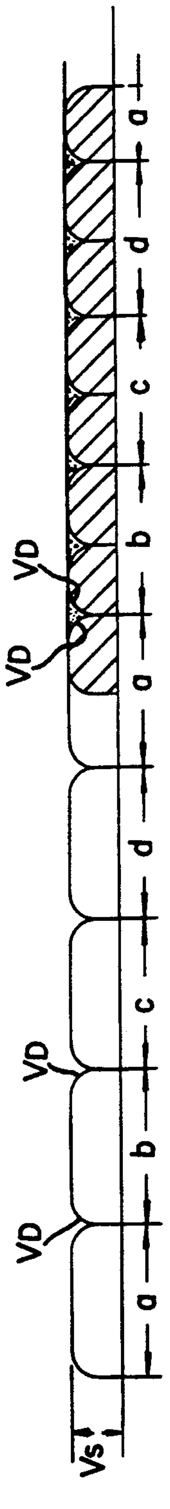
FIG. 7(B is a developed view of a charge potential.

During the time when the metallic container 14 passes the front stage charging device 5 and passes the rear stage charging device 5*a*, while rotating, the charging to the areas a, b, c and d to be charged of the metallic container 14 is delayed by ½ cycle as shown in FIG. 7(B) with hatching lines, whereby the low potential portions VD due to the charging device 5 are compensated for (black color portion in FIG. 7(B)), the substrate coat film 16 for printing of the metallic container 14 is charged uniformly with the constant surface potential Vs.

Accordingly, there is obtained a printing in which color tones are mutually accorded by the exposure, developing and fixing processes in the rear stage treatments.

The space L is not limited to the ½ delayed cycle of each of the charged areas a, b, c and d, but the space may be optionally changed in accordance with the size or rotating speed of the metallic container 14.

The front and rear stage charging devices 5 and 5*a* may be located adjacently and, in such case, the rotating delivering speed of the metallic container 14 may be changed between the respective charging devices to shift the charge phases between the front and rear stages.

A contact type charging method such as using a conductive brush may be substituted for a non-contact type charging method such as using a scorotron type charging device.

In this Example, the charging device 19 is disposed on the upper side in the delivering direction of the metallic container 14 and the metallic container 14 is rotated in the clockwise direction, but the present invention is not limited to this example and the charging device may be disposed on the lower side in the delivering direction of the metallic container to be rotatable in the clockwise o counterclockwise direction.

Figure 8:
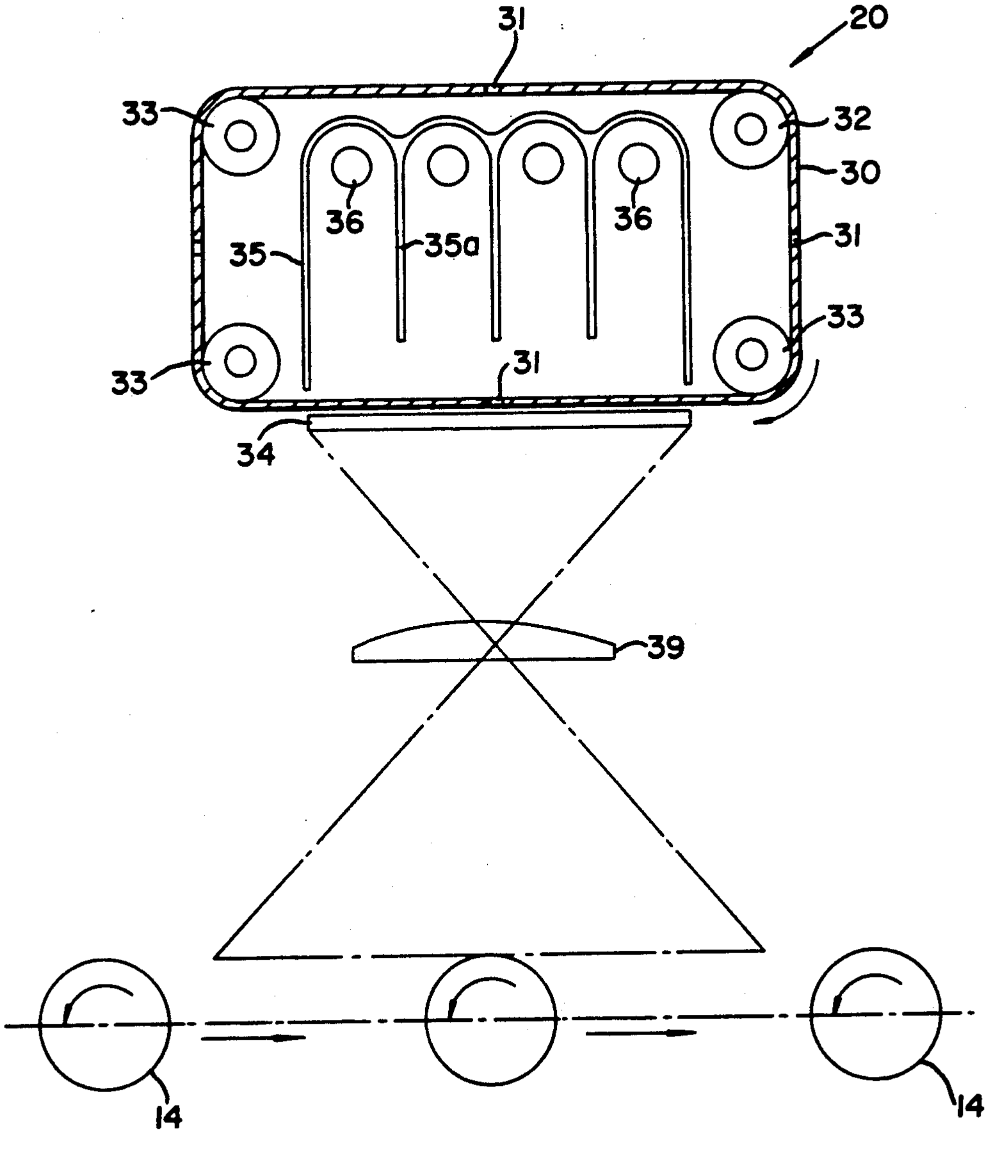
FIG. 8 is a schematic view of a first example of an exposure device.

FIG. 8 shows a first example of the image exposure device 20, in which a circulation belt 30 as means for transferring a light from a light source is located and the belt 30 is provided with slits 31 with predetermined spaces in the widthwise direction of the belt 30, which is rotated in the arrowed direction by a driving roller 32 and three follower rollers 33. Gears are provided for both end portions of the driving roller 32 and the gears are engaged with engaging holes formed in an endless manner at both side ends in the widthwise direction of the circulation belt 30 to prevent false rotation.

A lamp cover 35 opened to the side of an original 34 is located in the circulation belt 30 and the lamp cover 35 is divided into four sections by partition walls 35*a* into which lamps 36 are arranged respectively. The inner surface of the lamp cover 35 is coated with black color to absorb the lights from the lamps 36. Accordingly, the lights passing the slits 31 will be deemed as false parallel lights by sectioning the lamp cover 35 into four sections by the partition walls 35*a* and coating the inner surface of the lamp cover 35 with black color. In case of non-parallel lights, the lights passing the slits disperse and the lights ar overlapped at portions other than the predetermined exposure portions, thus obtaining no good image.

The movement of the circulation belt 30 provided with the slits 31 in synchronism with the rotation delivery of the metallic container 14 may be carried out by, for example, inputting a signal to a microcomputer from a rotary encoder attached to a driving device of the feed chain 29 of the container supporting member 23 shown in FIG. 6 and controlling the rotation of the motor for driving the driving roller 32 through a motor control circuit.

Figure 9:
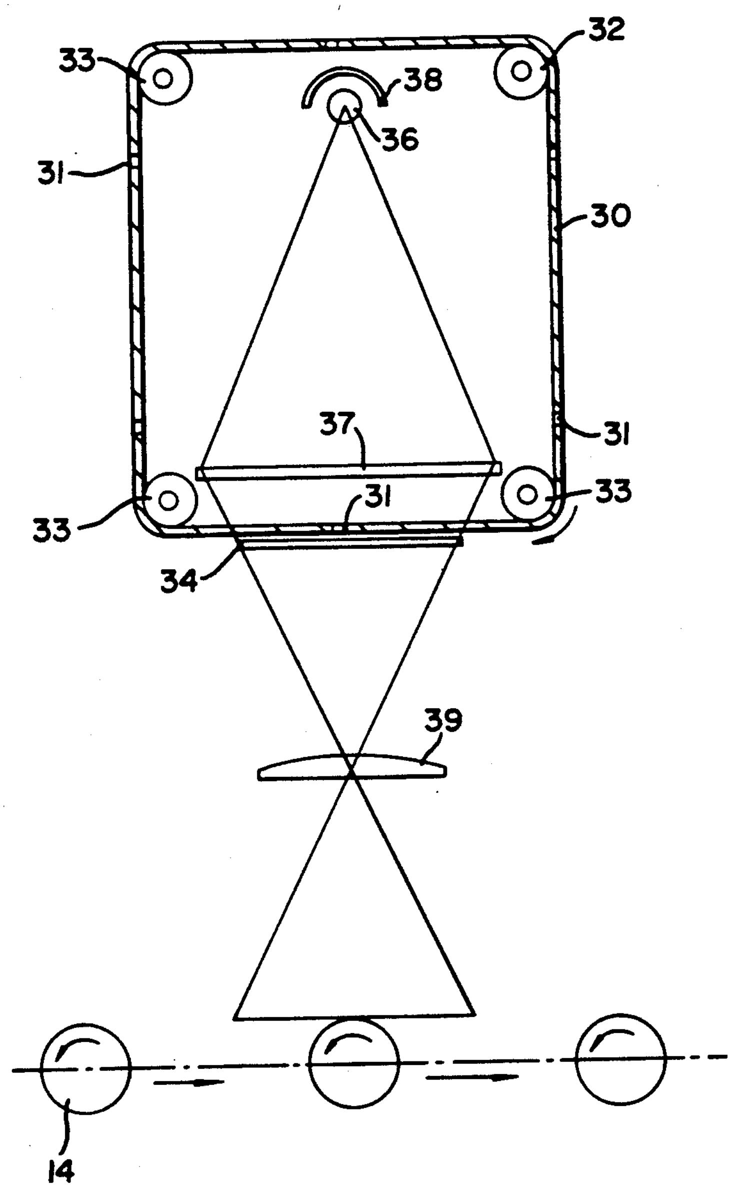
FIG. 9 is a schematic view of a second example of an exposure device.

FIG. 9 represents a second example of the image exposure device 20, in which, as described with respect to the first example of the exposure device, the circulation belt 30 is provided with slits 31 with predetermined spaces in the widthwise direction of the belt 30, which is rotated in the arrowed direction by a driving roller 32 and three follower rollers 33 in synchronism with the delivery of the metallic container 14. However, in this example, one lamp 36 is utilized as a light source and the light from the lamp 36 is focused through a light collecting lens 37 (Fresnel lens) to pass the slit 31. Reference numeral 38 designates a reflection mirror.

Accordingly, the metallic containers 14 each provided with the substrate coat film 16 charged uniformly with the constant surface potential by the charging device 19 are rotated and continuously delivered. The light from the lamp 36 is moved through the slits 31 of the circulation belt 30 moving endlessly in synchronism with the rotation delivery of the metallic container 14 and the light is projected to the color separation original 34. In this manner, the image of the original 34 is sequentially projected to the metallic container 14 by passing the lens 39, and the electrostatic latent image is formed on the metallic container 14.

As the lamp 36 for the light source, there may be used a halogen lamp, xenon lamp, krypton lamp or the like.

In the first and second examples of the exposure device 20, the lens 39 is utilized, but the lens 39 may be eliminated by locating the original 34 to a portion close to the metallic container 14.

Figure 10:
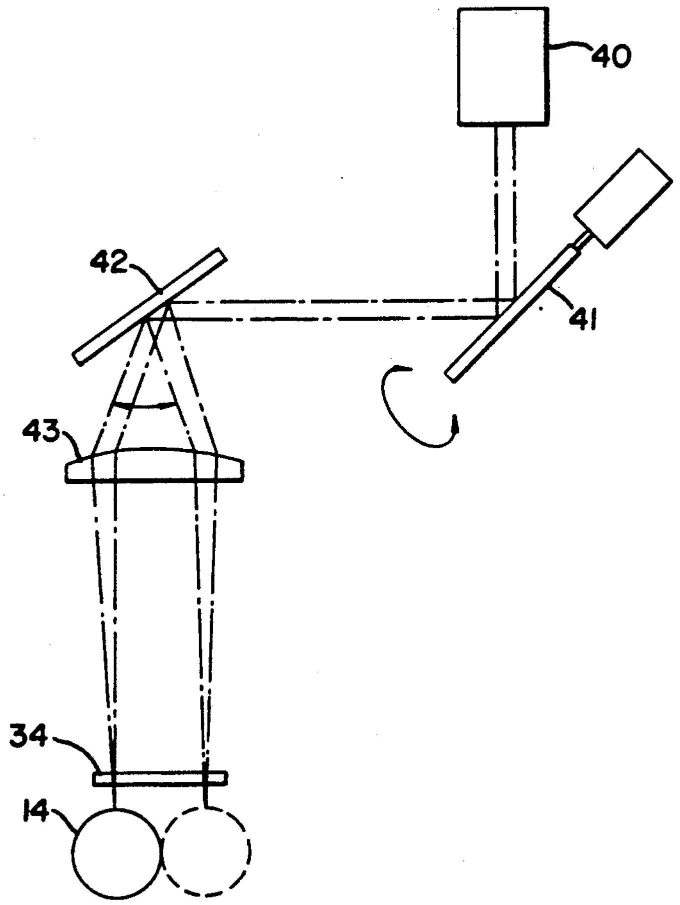
FIG. 10 is a schematic view of a third example of an exposure device.

FIG. 10 represents a third example of the image exposure device 20, in which a semiconductor laser device 40 is utilized as a light source and laser beam from the semiconductor laser device 40 is transferred by galvano mirrors 41 and 42 as laser beam transferring means in synchronism with the rotation delivery of the metallic container 14. The arrangement angles of the galvano mirrors 41 and 42 are changed in accordance with the rotation delivery of each of the metallic containers 14. Namely, the arrangement angles of the galvano mirror 41 are changed for scanning the laser beam in the axial direction i.e. main scanning direction, of the metallic container 14 and the arrangement angles of the galvano mirror 42 are changed for scanning the laser beam in the diametrical direction, i.e. sub-scanning direction, of the metallic container 14. The galvano mirror 41 may be a polygon mirror.

Accordingly, the laser beam emitted from the semiconductor laser device 40 is reflected by the galvano mirrors 41 and 42, passes the fθ lens 43 and irradiates the original 34 subjected to the color separation, whereby the laser beam forms an image on the metallic container 14 through the original 34 and the electrostatic latent image is then formed on the surface of the metallic container 14.

Laser beam of He - Ne, Ar ion, He - Cd, Ruby or YAG may be substituted for the semiconductor laser beam as the light source.

According to the third example, the structure thereof may be simplified in comparison with that of the first or second example.

Figure 11:
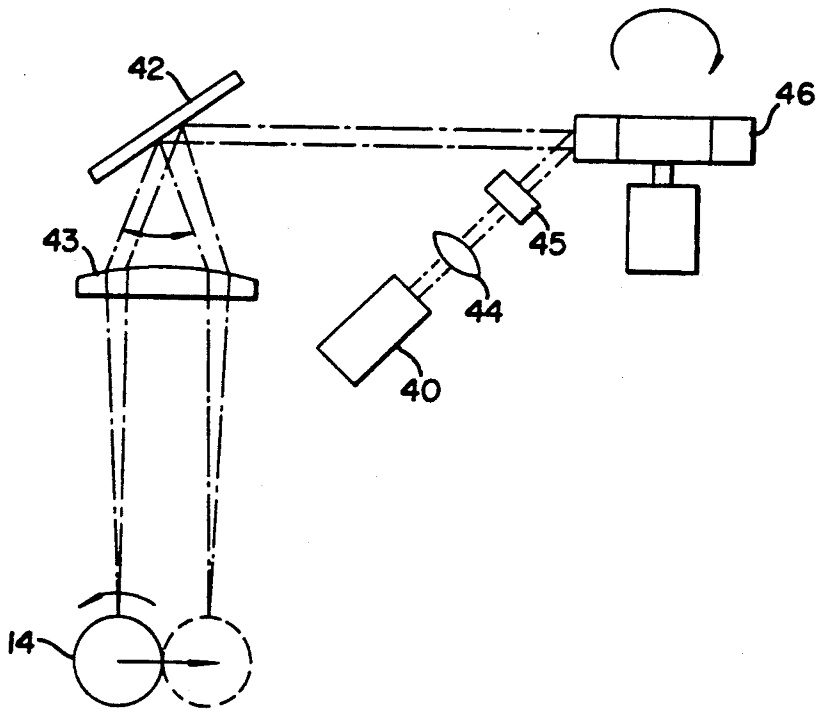
FIG. 11 is a schematic view of a fourth example of an exposure device.

FIG. 11 represents a fourth example of the image exposure device 20, in which the semiconductor laser 40 as the light source is light-modulated in accordance with the color separation data (for example, binary data or gradation data).

The laser beams emitted from the semiconductor laser device 40 are made parallel with each other through a collimator lens 44 and the sectional shapes of the parallel beams are shaped into circular shapes through a cylindrical lens 45. The beams are then reflected by a polygon mirror 46 and the galvano mirror 42 as beam transferring means for transferring the light from the light source and the reflected light passes the fθ lens 43 and the image is formed on the surface of the metallic container 14.

Accordingly, the laser beam is scanned in the predetermined direction at the constant speed by the polygon mirror 46 on the metallic container 14, whereby an image exposure is made corresponding to the color separation data due to such scanning as mentioned above.

Another mirror, not shown, is arranged near the fθ lens 43 at a portion outside the printing area of the metallic container 14 and when the laser beam is projected to this mirror, the projected beam is detected by a light sensor, not shown, and a horizontal synchronization signal is generated, whereby the write-in operation of the image data for one printing line is carried out.

According to the present example, the image exposing speed can be improved and the structure thereof can be simplified in comparison with the first and second examples. In addition, it becomes possible to adapt the plateless printing operation in which data from a computer can be written as it is.

As described above, in the first and second examples, the limited slit lights are utilized and in the third and fourth examples, the limited spot lights are utilized, whereby the images with no deformation are formed and fine images with no light fog from the light source can be formed.

The metallic container 14 with the electrostatic latent image formed by charging and exposing the substrate coat film for printing as described above is delivered to a developing tank of a liquid developing device 21, in which the image is formed by attracting a liquid toner by a developing electrode 47 restricting so-called an edge effect of the electrostatic latent image. Thereafter, the metallic container 14 is delivered through a cleaning tank 48 for removing excess toner and to the fixing device 22 to finish first one color printing operation. The multicolor printing operation can be performed by repeating these processes on the metallic container 14, which is then coated with the finishing varnish and baked in the heating oven. The thus formed metallic container 14 is further delivered so as to effect the can manufacturing workings such as nick-in working and flange working.

As the toner for the developing process, there may be used a wet-type toner prepared by dispersing, into the binder resin, a die or pigment such as diazo yellow, benzidine yellow, sproin yellow, rhodamine, quinacridone, carmine 6B, copper phthalocyanine, or carbon black and dispersing fine particles of such die or pigment into an insulative liquid, for example, petroleum series solvent such as isoparafin, carbon tetrachloride or cyclohexane or into an olefin series solvent.

The wet-type toner has a particle size of 1 μ or less in the diameter, so that an image having high resolution is formed.

It is required for the metallic container, particularly a metallic can, to be subjected to the spray-coating and baking to protect the inner surface thereof and, hence, it is required for the toner to have a heat-resisting property and also required to have good workability and adhesion property for the neck-in working and the flange working which will be performed thereafter. Moreover, after the filling of the content in the metallic container, since the steam sterilization at a temperature of 100° C. or higher is performed, it will be required for the toner to have hot-water resisting property. Accordingly, it is preferred to utilize a thermosetting resin such as epoxy resin, acrylic resin and the like as the binder for the toner.

The finishing varnish is applied for protecting the substrate coat film for printing and imparting luster thereto. Namely, the toner layer and the substrate coat film for printing are likely damaged by the mutual collision of the metallic containers and the contact with the feed guide during the delivering process after the printing process and, in an adverse case, abrasion or peeling thereof may be caused. In addition, after the filling of the content in the metallic container, since the steam sterilization treatment is performed at 100° C. or higher, the toner layer and the substrate coat film for printing may be softened or decolored. In order to protect the toner layer and the substrate coat film for printing from the above described adverse phenomena, it is necessary to apply the finishing varnish directly after the printing process.

It will be preferred to utilize, as the finishing varnish, acrylic resin, polyester resin, epoxy resin, alkyd resin, amino resin, polyurethane resin, and the like, or combination thereof, and acrylic resin or polyester resin is preferred.

Industrial Applicability

The printed metallic container according to the present invention is formed with a metallic base material on which a surface treating film and a titanium oxide-containing organic resin coat film, so that the printing of the small amount of multiple kinds of products can be instantaneously performed.

The titanium oxide-containing organic resin coat film according to the present invention is superior in the workability and the adhesion property to metal, so that the coat film can be used for the photosensitive material which also serves as the white coating.

In the multicolor printing method according to the present invention, the metallic containers are continuously delivered while rotating, uniformly charged by shifting the charge phases and exposed by transferring the light from the light source in synchronism with the rotation delivery of the metallic container, so that the suitable printing can be done at high printing speed with the precise color registering.

We claim:

1. A printed metallic container characterized by a titanium oxide-containing organic resin coat film layer of a photosensitive characteristic of $I \times t_{\frac{1}{2}} < 100$ mW·sec/cm$^2$ (I: light intensity and $t_{\frac{1}{2}}$ light attenuation half-life of surface potential) as a substrate coat film for printing, formed on a surface treating film layer of a thickness of 0.2 $\mu$ or less, the surface treating film layer being provided on a metallic base material.

2. A printed metallic container according to claim 1, wherein the titanium oxide-containing organic resin coat film has a composition ratio of titanium oxide to a binder resin of 70/30 to 40/60 by weight.

3. A printed metallic container according to claim 1, wherein the titanium oxide-containing organic resin coat film has a thickness of 5 to 20$\mu$.

4. A multicolor printing method for a metallic container which comprises printing each color, by repeating an electrophotographic process, on a metallic container provide with a titanium oxide-containing organic resin coat film layer having a photosensitive characteristic of $I \times t_{\frac{1}{2}} < 100$ mW·sec/cm$^2$ formed on a surface treating film layer having a thickness of 0.2 $\mu$ or less and provided on a surface of the metallic container, said method being characterized by the steps of continuously delivering the metallic containers supported by container supporting means with electrically earthed state of the containers while rotating the metallic containers in proportional synchronism with the delivered displacement of the metallic containers, charging the titanium oxide-containing organic resin coat film to a constant surface potential by a plurality of charging device arranged in a delivering direction of the metallic containers and thereafter charging the same to the same potential as the surface potential by shifting the charge phases and exposing for forming an electrostatic latent image while sequentially exposing the charged surface to light images by transferring light from a light source in synchronism with the rotation delivery of the metallic container.

5. A multicolor printing method for a metallic container according to claim 4, wherein a plurality of charging devices are divided into a plurality of groups arranged adjacently and the rotation delivery speeds of the metallic containers are changed between the charging devices of the respective groups to carry out the charging with the charge phases shifted.

6. A multicolor printing method for a metallic container according to claim 4, wherein an endless belt provided with slits is endlessly moved in synchronism with the rotation delivery of the metallic container, light from a light source is guided to an original through the slits and the light images of the original are sequentially slit-projected to the metallic container.

7. A multicolor printing method for a metallic container according to claim 4, wherein the light source is composed of a laser beam light source, a laser beam from the laser beam light source is projected to the original while moving in synchronism with the rotation delivery of the metallic container and the light images of the original are sequentially projected to the metallic container.

8. A multicolor printing method according to claim 4, wherein the light source is composed of a laser beam light source and the metallic container is scanned by and exposed to the laser beam modulated in output by an image signal.

* * * * *

UNITED STATES PATENT AND TRADEMARK OFFICE

CERTIFICATE OF CORRECTION

PATENT NO. : 5,093,671

DATED : March 3, 1992

INVENTOR(S) : Masaki Morotomi, et al

It is certified that error appears in the above-indentified patent and that said Letters Patent is hereby corrected as shown below:

On the cover page, Item [22], "Filed: Oct. 26, 1990" should read -- PCT Filed: Oct. 26, 1990 --.

After Item [22], the following should be inserted:

| | | |
|---|---|---|
| **-- [86]** | **PCT No.:** | **PCT/JP90/00236** |
| | **§ 371 Date:** | **Oct. 26. 1990** |
| | **§ 102(e) Date:** | **Oct. 26, 1990** |
| **[87]** | **PCT Pub. No.:** | **WO90/10257** |
| | **PCT Pub. Date:** | **Sept. 7, 1990 --** |

Signed and Sealed this

Third Day of August, 1993

Attest:

MICHAEL K. KIRK

*Attesting Officer* *Acting Commissioner of Patents and Trademarks*